(12) United States Patent
Ma

(10) Patent No.: US 9,977,751 B1
(45) Date of Patent: May 22, 2018

(54) METHOD AND APPARATUS FOR ARBITRATING ACCESS TO SHARED RESOURCES

(71) Applicant: Marvell International Ltd., Hamilton (BM)

(72) Inventor: Tianan Tim Ma, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 278 days.

(21) Appl. No.: 14/830,543

(22) Filed: Aug. 19, 2015

Related U.S. Application Data

(60) Provisional application No. 62/041,276, filed on Aug. 25, 2014.

(51) Int. Cl.
*G06F 13/16* (2006.01)
*G06F 13/366* (2006.01)

(52) U.S. Cl.
CPC ...... *G06F 13/1642* (2013.01); *G06F 13/1663* (2013.01); *G06F 13/366* (2013.01)

(58) Field of Classification Search
CPC .................. G06F 13/1663; G06F 13/1642
See application file for complete search history.

(56) References Cited

U.S. PATENT DOCUMENTS

| | | | | |
|---|---|---|---|---|
| 5,944,792 A * | 8/1999 | Yamato | ............... | H04N 21/21 348/E5.008 |
| 2008/0098401 A1* | 4/2008 | Weatherhead | ............ | G06F 9/526 718/104 |
| 2010/0325327 A1* | 12/2010 | Marietta | ............. | G06F 13/1642 710/240 |
| 2013/0263148 A1* | 10/2013 | Brueggen | ............. | G06F 9/5016 718/104 |

* cited by examiner

*Primary Examiner* — Farley Abad

(57) ABSTRACT

Embodiments include a method for arbitrating access to a plurality of resources by a plurality of components of a computing system, the method comprising: assigning, to each resource of the plurality of resources, a corresponding identification number, wherein a first resource of the plurality of resources is assigned a first identification number; assigning the first resource to a first component such that the first component has access to the first resource; storing (i) the first identification number of the first resource in a first assignment register of a plurality of assignment registers, and (ii) an identification of the assignment of the first resource to the first component in a first queue register; and while the identification of the assignment of the first resource is stored in the first queue register, refraining from assigning the first resource to any component, other than the first component.

18 Claims, 4 Drawing Sheets

METHOD AND APPARATUS FOR ARBITRATING ACCESS TO SHARED RESOURCES

CROSS REFERENCE TO RELATED APPLICATIONS

This disclosure claims priority to U.S. Provisional Patent Application No. 62/041,276, filed on Aug. 25, 2014, which is incorporated herein by reference in its entirety.

TECHNICAL FIELD

Embodiments of the present disclosure relate to accessing shared resources in a computing system, and in particular to arbitrating access to shared resources.

BACKGROUND

Multi-thread processing and multi-processor systems are becoming more and more common in modern computing systems. For example, in such a system, multiple threads from multiple processors run in parallel. Very often, these parallel threads share common resources, e.g., a shared register, shared memory, shared cache, and/or the like. In an example, in addition to the multiple threads, one or more hardware modules also share the common resources.

In an example, for the integrity of data stored in these shared resources, at any time, only one thread or only one hardware module can access a shared resource, i.e., the access to the shared resource has to be exclusive. Thus, it is necessary to arbitrate access to a shared resource among multiple threads and hardware modules, to guarantee exclusive access to the shared resource and to maintain integrity of data stored in the shared resource.

SUMMARY

In various embodiments, the present disclosure provides a method for arbitrating access to a plurality of resources by a plurality of components of a computing system, the method comprising: assigning, to each resource of the plurality of resources, a corresponding identification number, wherein a first resource of the plurality of resources is assigned a first identification number; assigning the first resource to a first component of the plurality of components such that the first component has access to the first resource; based on assigning the first resource to the first component, storing (i) the first identification number of the first resource in a first assignment register of a plurality of assignment registers, and (ii) an identification of the assignment of the first resource to the first component in a first queue register of a plurality of queue registers; and while the identification of the assignment of the first resource to the first component is stored in the first queue register, refraining from assigning the first resource to any component, other than the first component, of the plurality of components.

In various embodiments, the present disclosure also provides a system comprising: a plurality of components; a plurality of resources, wherein each resource of the plurality of resources is assigned a corresponding identification number, and wherein a first resource of the plurality of resources is assigned a first identification number; and an arbiter configured to arbitrate access to the plurality of resources by the plurality of components, wherein the arbiter comprises an arbiter module configured to assign the first resource to a first component of the plurality of components such that the first component has access to the first resource, a plurality of assignment registers, wherein based on the first resource being assigned to the first component, the first identification number of the first resource is stored in a first assignment register of the plurality of assignment registers, and a plurality of queue registers, wherein based on the first resource being assigned to the first component, an identification of the assignment of the first resource to the first component is stored in a first queue register of the plurality of queue registers, wherein while the identification of the assignment of the first resource to the first component is stored in the first queue register, the first resource is not assigned to any component, other than the first component, of the plurality of components.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
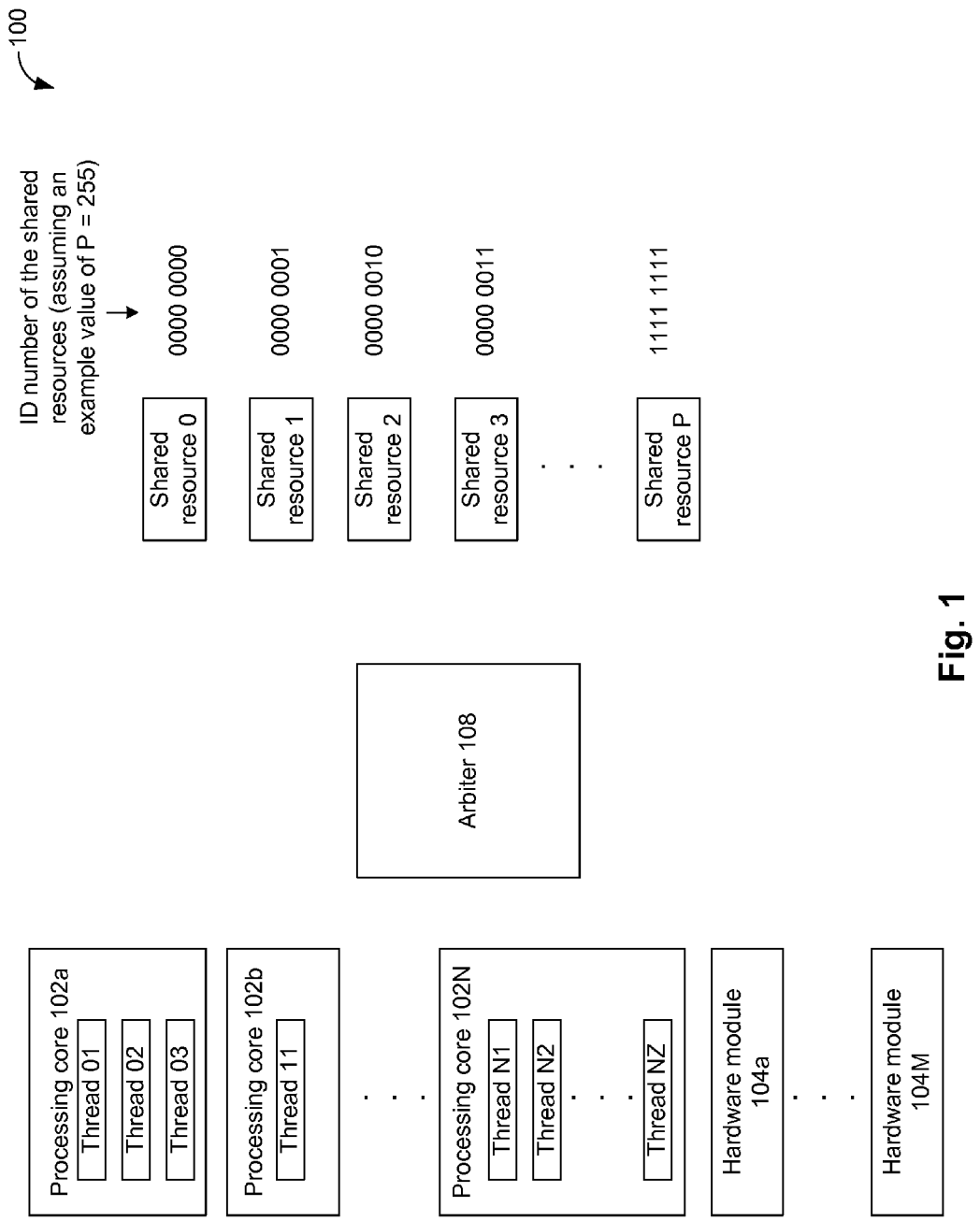
FIG. 1 schematically illustrates a computing system that arbitrates access to one or more of a plurality of shares resources.

FIG. 1 schematically illustrates a computing system 100 (henceforth referred to as "system 100") that arbitrates access to one or more of a plurality of shares resources 0, 1, 2, . . . , P, where P is an appropriate integer. In an embodiment, the system is a multi-core processing system comprising a plurality of processing cores 102a, . . . , 102N. In an embodiment, one or more of the processing cores 102a, . . . , 102N are multithread processing cores, i.e., runs two or more threads in parallel. For example, as illustrated in FIG. 1, the processing core 102a runs threads 01, 02 and 03, the processing core 102b runs thread 11, the processing core 102N runs threads N1, N2, . . . , NZ, and so on, where Z is an appropriate integer. Although in the example of FIG. 1, each processing core is illustrated to operate a corresponding specific number of threads, in another example, individual processing cores can operate any other appropriate number of threads.

In an embodiment, the system 100 further comprises a plurality of hardware modules (HM) 104a, . . . , 104M, where M is an appropriate integer. The hardware modules 104a, . . . , 104M comprise, for example, input/output modules, packet processing modules, components that perform routing of data packets, and/or the like.

In an embodiment, the shared resources 0, . . . , P comprise resources that are shared among various threads in the processing cores 102a, . . . , 102N and/or the hardware modules 104a, . . . , 104M. The shared resources, for example, include memory, cache, registers, buffers, and/or the like. Merely as an example, the shared resource 0 represents a block of memory that can be accessed by the processing cores 102a, . . . , 102N and/or the hardware modules 104a, . . . , 104M.

In an embodiment, to maintain data integrity, a shared resource can be accessed by only one component at a given time. Thus, for example, at any given time, a single one of the threads and the hardware modules can access a specific shared resource, e.g., to main integrity of data stored in the shared resource. In an embodiment, an arbiter 108 arbitrates access by the processing cores 102a, . . . , 102N and/or the hardware modules 104a, . . . , 104M to the shared resources, as will be discussed in more detail herein.

In an example, a maximum number of shared resources in the system 100, for which the arbiter 108 can arbitrate access, can be any appropriate number, e.g., 256, 1028, 4096, or the like. For the purposes of this disclosure, without limiting the scope of this disclosure, and merely as an example, this maximum number is assumed to be 256.

In an embodiment, each shared resource of the system 100 is assigned a unique identification (ID) number. As the maximum number of shared resources, for which the arbiter 108 can arbitrate access, is assumed to be 256, the unique ID numbers are 8 bit long. For example, assume there are 256 number of shared resources 0, 1, . . . , P in the system 100, i.e., P=255 (although P can be less than 255, i.e., there can be less than 256 shared resources in the system 100). In an example, the shared resources 0, 1, 2, . . . , P are assigned ID numbers of 0000 0000, 0000 0001, . . . , 1111 1111, respectively. FIG. 1 also illustrates the ID numbers assigned to the various shared resources. In an embodiment and as will be discussed in more detail herein, the arbiter 108 uses the ID numbers of the shared resources, e.g., to arbitrate access to the shared resources.

As previously discussed herein, in an embodiment, individual ones of the threads running on the processing cores 102a, . . . , 102N, and the hardware modules 104a, . . . , 104M can access the shared resources 0, . . . , P. In an embodiment, the threads, the processing cores 102a, . . . , 102N and the hardware modules 104a, . . . , 104M, which can have access to the shared resources 0, . . . , P, are referred to herein as components. Thus, a component can access one or more of the shared resources 0, . . . , P of the system 100. In an example, it is assumed that the system 100 has S number of components, represented by components 1, . . . , S, where S is an integer. Thus, a component of the components 1, . . . , S can be, for example, one of the threads running on the processing cores 102a, . . . , 102N, one of the hardware modules 104a, . . . , 104M, or the like.

Figure 2:
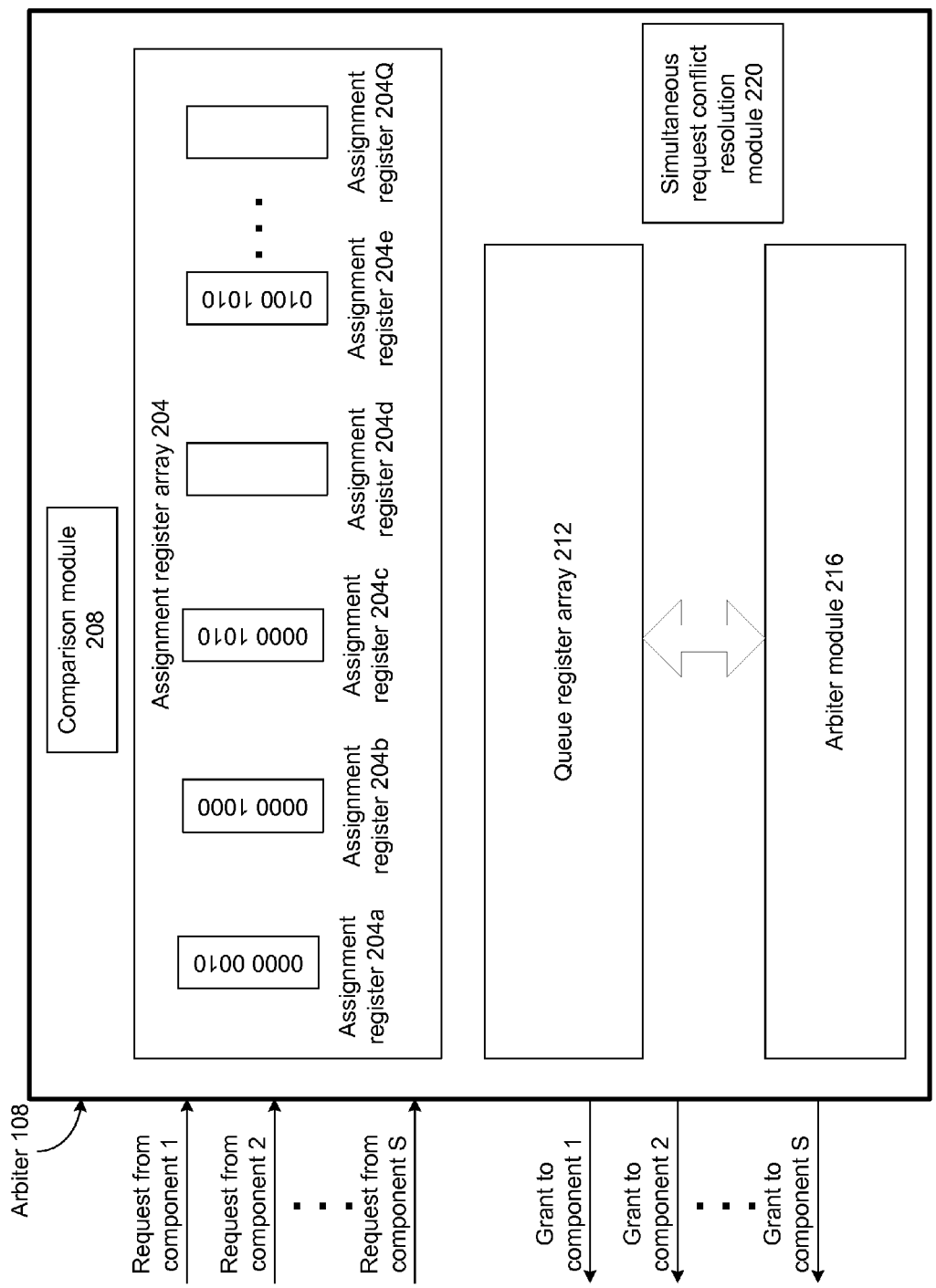
FIG. 2 schematically illustrates an example implementation of an arbiter configured to arbitrate access to one or more of a plurality of shares resources.

FIG. 2 schematically illustrates an example implementation of the arbiter 108 of FIG. 1. In an embodiment, the arbiter 108 receives requests from the components 1, . . . , S, for accessing one or more of the shared resources 0, . . . , P. A component, for example, component 1, issues a request to the arbiter 108 for accessing, for example, shared resource 0, if the component 1 desires to add, modify, delete or otherwise need to access data stored in the shared resource 0.

In an embodiment, the arbiter 108 comprises an assignment register array 204 comprising a plurality of assignment registers 204a, 204b, . . . , 204Q. In an embodiment, there are Q number of assignment registers in the assignment register array 204 (where Q is an integer), and the arbiter 108 is configured to simultaneously assign a maximum of Q number of shared resources among the components 1, . . . , S. As previously discussed herein, in an example, there are 256 number of shared resources. In an example, Q is equal to 32 (where 32 is merely an example, and the integer Q can have any other appropriate value). Thus, in such an example, the arbiter can simultaneously assign a maximum of 32 shared resources, from among the 256 shared resources 0, . . . , P, to the components 1, . . . , S.

In an embodiment, ones of the assignment registers 204a, . . . , 204Q stores ID numbers of the shared resources that are currently assigned to various components. For example, in FIG. 2, the assignment register 204a stores the ID number 0000 0010 corresponding to the shared resource 2, implying that the shared resource 2 has been currently assigned to a component of the components 1, . . . , S. Similarly, the assignment registers 204b, 204c and 204e store the ID numbers 0000 1000, 0000 1010, and 0100 1010, respectively, implying that the shared resources 8, 10 and 74 have been currently assigned to three corresponding components.

In the example of FIG. 2, only four assignment registers 204a, 204b, 204c and 204e store corresponding ID numbers, and the remaining assignment registers of the assignment register array 204 are empty. This, for example, implies that four shared resources (e.g., shared resources 2, 8, 10 and 74) are currently assigned to four corresponding components, and the remaining shares resources are not currently assigned.

Figure 3:
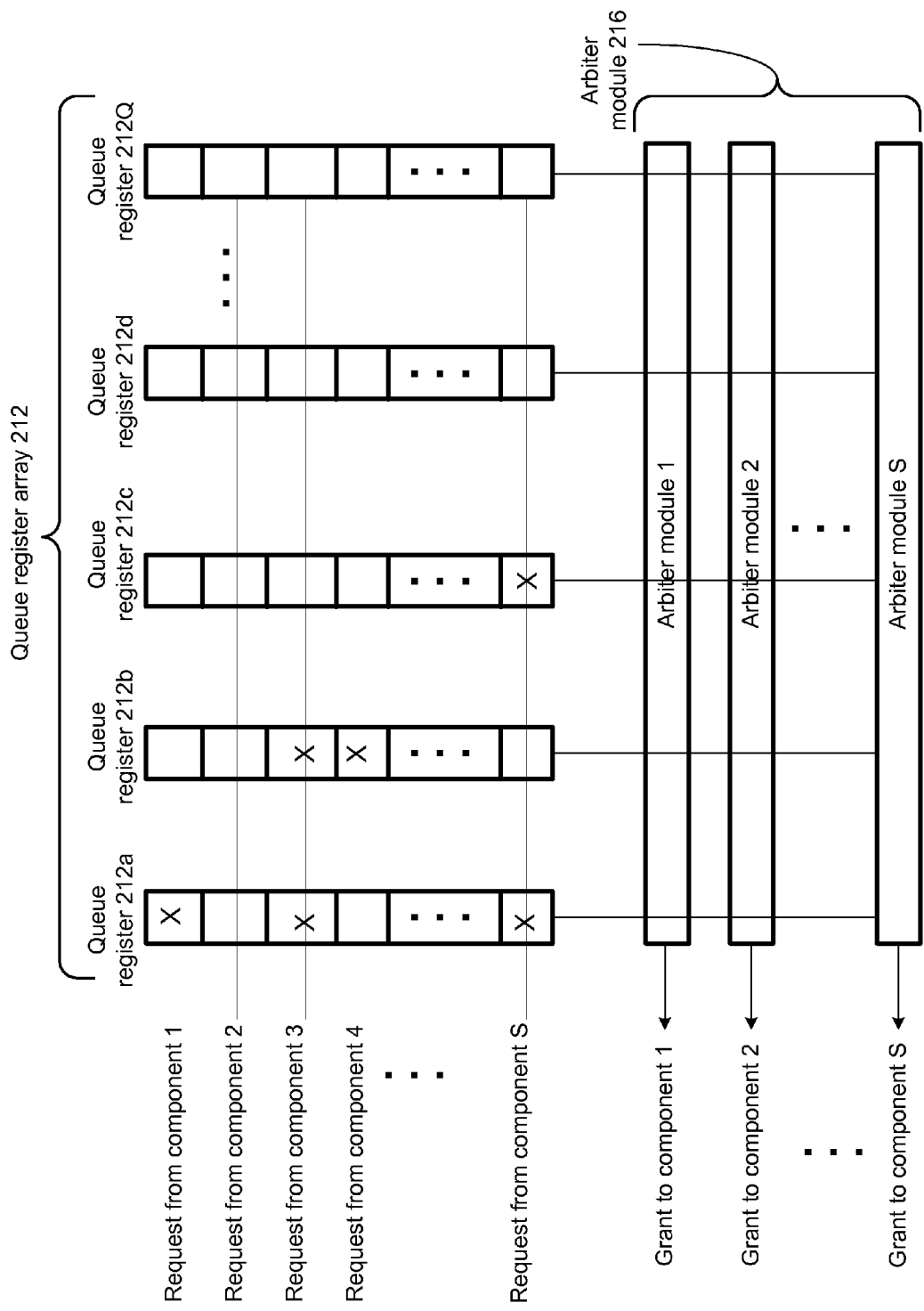
FIG. 3 schematically illustrates a queue register array and an arbitration module of the arbiter of FIG. 2 in more details.

In an embodiment, the arbiter 108 further comprises a simultaneous request conflict resolution module 220 (henceforth referred to as "module 220") and a comparison module 208, which will be discussed in detail herein later. In an embodiment, the arbiter 108 further comprises a queue register array 212 and an arbiter module 216, which are schematically illustrated in FIG. 3 in more details. As illustrated in FIG. 3, the queue register array 212 comprises a plurality of queue registers 212a, . . . , 212Q, corresponding to the assignment registers 204a, . . . , 204Q of the assignment register array 204. For example, the queue register 212a of the queue register array 212 corresponds to the assignment register 204a of the assignment register array 204; the queue register 212b of the queue register array 212 corresponds to the assignment register 204b of the assignment register array 204; and so on.

Referring again to FIG. 2, the assignment register 204a currently has the ID number 0000 0010 of the shared resource 2, implying that the shared resource 2 is currently assigned to a corresponding component. Assume, for example, that the shared resource 2 is currently assigned to the component 1. While the shared resource 2 is currently assigned to the component 1, one or more other components can request the arbiter 108 to access the shared resource 2. The queue register 212a of the queue register array 212 queues all the requests for assessing the shares resource 2, while the shared resource 2 is assigned to the component 1.

For example, as illustrated in FIG. 3, the queue register 212a is configured to receive requests from each of the components 1, . . . , S. Assume that the corresponding assignment register 204a stores the ID number 0000 0010 of the shared resource 2, and the shared resource 2 is currently assigned to the component 1. In an embodiment, the queue register 212a is configured to queue requests from various components that desire to access the shared resource 2. In an embodiment, the queue register 212a is configured to identify the component to which the shared resource 2 is currently assigned. FIG. 3 schematically illustrates a manner in which the queue register 212a queues requests from various components (although, in another embodiment, the queue register 212a can queue the various requests in another appropriate manner, e.g., in the form of a queue). For example, as the component 1 is currently assigned the shared resource 2, an identification of the component 1 is listed in the queue register 212a (e.g., illustrated using a "X" mark corresponding to the "Request from component 1" line in the queue register 212a). Also assume, while the shared resource 2 is currently assigned to the component 1, each of components 3 and S also requests to access the shared resource 2. Accordingly, identifications of the components 3 and S are listed in the queue register 212a (e.g., illustrated using "X" marks corresponding to the requests from components 3 and S in the queue register 212a).

Similarly, in FIG. 3, "X" marks corresponding to the components 3 and 4 are stored in the queue register 212b, implying, for example, that the shared resource 8 (e.g., as the assignment register 204b stores the ID number of the shared resource 8) is currently assigned to component 3, and component 4 is in queue for accessing the shared resource 8.

Similarly, in FIG. 3, a "X" mark corresponding to only the component S is stored in the queue register 212c, implying, for example, that the shared resource 10 (e.g., as the assignment register 204c stores the ID number of the shared resource 10) is currently assigned to the component S, and no other component is in queue for accessing the shared resource 10.

In an embodiment, a request from a component to access a specific shared resource also includes a priority associated with the request. For example, if a component wants to access a shared resource for a relatively high priority task, the associated priority for the request to access the shared resource will have a high priority. On the other hand, if the component wants to access the shared resource for a relatively low priority task, the associated priority for the request to access the shared resource will have a low priority. Merely as an example, each request to access a shared resource can be assigned a priority in a scale of 1 to 10, with 10 representing the highest priority and 1 representing the lowest priority.

In an embodiment, a queue register stores, along with a list of components that desires to access a specific shared resource, a corresponding priority associated with the requests issued by the components. For example, in FIG. 2, the components 1, 3 and S are listed in the queue register 212a, along with corresponding priorities of the corresponding requests issued by the components 1, 3 and S to access the shared resource 2.

In an embodiment, the arbiter module 216 comprises arbiter modules 1, . . . , S, corresponding to the components 1, . . . , S. For example, the arbiter module 1 is configured to grant a request to the component 1, the arbiter module 2 is configured to grant a request to the component 2, and so on. Having an arbiter module dedicated to a corresponding component, for example, speeds up the arbitration operation to arbitrate the shared resources among the components 1, . . . , S. For example, the arbiter modules 1, . . . , S operate in parallel in arbitrating access by the corresponding components 1, . . . , S. The queue register array 212 queuing the waiting requests ensures that there are no conflicts in the arbitration performed in parallel by the arbiter modules 1, . . . , S. However, in an alternate embodiment, the arbiter modules 1, . . . , S are integrated as a single arbiter module. In an embodiment, each of the arbiter modules 1, . . . , S have access to each of the queue registers 212a, . . . , 212Q, as illustrated in FIG. 3. For example, the arbiter module 1 has access to each of the queue registers 212a, . . . , 212Q.

Figure 4:
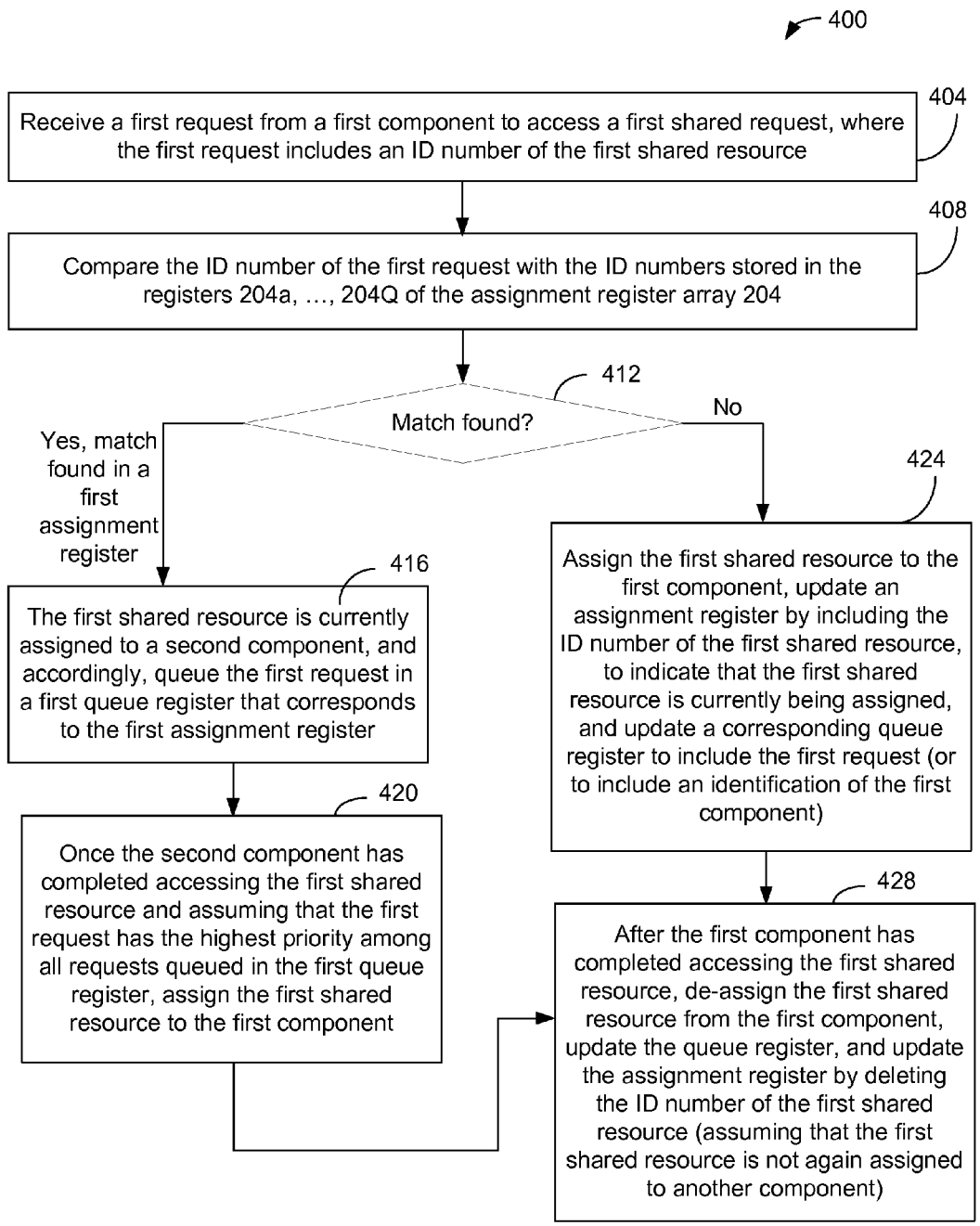
FIG. 4 illustrates a flow diagram of an example method for arbitrating access to a plurality of shared resources.

FIG. 4 illustrates a flow diagram of an example method 400 for operating the system 100 to arbitrate access to a plurality of shared resources (e.g., shared resources 1, . . . , P of FIG. 1). At 404, a first request from a first component (e.g., component S) to access a first shared resource (e.g., shared resource P) is received (e.g., by the arbiter 108), where the first request includes an ID number (e.g., 1111 1111, as illustrated in FIG. 1) of the first shared resource.

At 408, a comparison between (i) the ID number of the first shared resource included in the first request and (ii) the ID numbers stored in the assignment registers 204a, . . . , 204Q of the assignment register array 204 is performed, e.g., by the comparison module 208 of the arbiter 108. In an embodiment, the comparison module 208 is implemented in hardware (e.g., as opposed to implementing the comparison module 208 in software) to increase a speed of the comparison. At 412, it is determined whether a match to the comparison is found.

Finding no match in the assignment register array 204 implies that the first shared resource is not currently assigned to any component. Accordingly, if no match is found (i.e., if "No" at 412), at 424, the first shared resource is assigned to the first component (e.g., by the arbiter module S of FIG. 3). Also at 424, an assignment register (e.g., one of the assignment registers 204a, . . . , 2040, which is currently empty) is updated by including the ID number of the first shared resource, to indicate that the first shared resource is currently assigned (e.g., to the component S). For example, if the assignment register 204d is empty, the assignment register 204d is updated by including the ID number of the first shared resource. Also, the first request (or an identification of the first component) is listed in the corresponding queue register 212d, to indicate that the first component is currently assigned access to the first component.

At 428, once the first component has completed accessing the first shared resource, the first shared resource is de-assigned from the first component. The queue register 212d is updated, e.g., by removing the first request (or an identification of the first component) from the queue register 212d. Also, if no other requests are queued in the queue register 212d, then the first shared resource is not to be assigned again to another component. In such a case, the assignment register 204d is updated by deleting the ID number of the first shared resource from the assignment register 204d. However, if there are one or more other requests queued in the queue register 212d, then the first shared resource is assigned to another component (e.g., based on a priority of the queued requests), e.g., as discussed in more detail herein with respect to blocks 416 and 420 of the method 400.

Referring again to the block 412, assume a match is found (i.e., "Yes" at 412) in a first assignment register (e.g., the assignment register 204a) at 412. This implies that the first shared resource is currently assigned to a second component, and accordingly, at 416, the first request is queued in a first queue register (e.g., queue register 212a) that corresponds to the first assignment register. In an embodiment, a priority associated with the first request is also queued in the first queue register.

At 420, once the second component has completed accessing the first shared resource (i.e., when the identification of the second component is deleted from the corresponding queue register) and assuming that the first request has the highest priority among all requests queued in the first queue register (or assuming that the first request is the only request queued in the first queue register), the first shared resource is assigned to the first component. However, if the first request does not have the highest priority among all requests queued in the first queue register, a component corresponding to the request having the highest priority among all requests queued in the first queue register is assigned the first shared resource. In such a case, the first component waits for its turn to arrive in due course.

Once the first component is assigned the first shared resource at 420, the method 400 loops to 428, where the first shared resource is eventually de-assigned from the first component, after the first component has completed accessing the first shared resource.

In an embodiment, if multiple requests are queued in a queue register for assignment (e.g., where the multiple requests are from corresponding multiple components and are for accessing a specific shared resource), then the requests are assigned based on their respective priorities, as discussed with respect to block 416 of FIG. 4. For example, if a first request has the highest priority among all the requests queued in a queue register, a first component that issued the first request is assigned the specific shared resource when the specific shared resource is available for assignment.

However, in an embodiment, there may be situations when multiple requests having the same priority level are queued in a queue register. In such a situation, any appropriate method may be applied to choose a request for assignment.

In one example, a round robin method is used for assignment. In another example, the assignment is performed in a random or a pseudo-random manner.

In yet another example, in addition to considering the priority of the requests, the associated components (e.g., from which the requests are generated) are also considered for assignment. For example, in addition to the priority of the requests, each component is also associated with a corresponding priority or a corresponding physical port numbering. If a first request from a first component and a second request from a second component has similar priorities and if both the first and second requests are queued in a queue register, the assignment of the corresponding shared resource is then based on the relative priority or physical port numbering associated with the first component and the second component.

In yet another example, when multiple requests having the same priority level are queued in a queue register, a sequence in which the multiple requests are received are considered when assigning the corresponding shared resource. In yet another example, any other appropriate criterion may be used for assigning a shared resource, when multiple requests having the same priority are queued in a queue register.

Assume a scenario in which a first shared resource is not currently assigned to any of the components (i.e., none of the assignment registers 204a, . . . , 204Q stores the ID number of the first shared resource). During a given arbitration cycle (which, for example, corresponds to a clock cycle of the system 100), if a component requests the first shared resource, then the component is assigned access to the first shared resource.

However, in an example, it is possible that multiple components simultaneously request access to the first shared resource (e.g., request access to the first shared resource during a same arbitration cycle), while the first shared resource is not currently assigned to any of the components. In an example, as the arbiter modules 1, . . . , S operate based at least in part on the status of the queue registers 212a, . . . , 212Q (and as the queue registers have not yet stored the multiple simultaneous requests from the multiple components yet), the arbiter modules 1, . . . , S may be unable to handle such a situation. In an embodiment, in such a situation, the module 220 receives the simultaneous multiple requests for accessing the same first shared resource (assuming that the first shared resource is not currently assigned to any component). The module 220 arbitrates among the multiple requests and assigns one component access to the first shared resource, e.g., based on the relative priorities of the requests and/or various other criteria discussed here (e.g., in case two or more of the multiple requests have the same priority). That is, in an embodiment, the module 220 arbitrates access during an arbitration cycle if (i) multiple requests for accessing a specific shared resource simultaneously arrive during the arbitration cycle and (ii) the specific shared resource is not currently assigned to any component. Once the module assigns one of the component access to the specific shared resource, the other requests are queued in a corresponding queue register, and subsequent assignment of the specific shared resource among the queued requests are handled by the corresponding arbiter module, e.g., as discussed with respect to FIG. 4.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method for arbitrating access to a plurality of resources by a plurality of components of a computing system, the method comprising:
    assigning, to each resource of the plurality of resources, a corresponding identification number, wherein a first resource of the plurality of resources is assigned a first identification number;
    assigning the first resource to a first component of the plurality of components such that the first component has access to the first resource;
    based on assigning the first resource to the first component, storing
        (i) the first identification number of the first resource in a first assignment register of a plurality of assignment registers, and
        (ii) an identification of the assignment of the first resource to the first component in a first queue register of a plurality of queue registers;
    while the identification of the assignment of the first resource to the first component is stored in the first queue register, refraining from assigning the first resource to any component, other than the first component, of the plurality of components;
    receiving a first request from a second component of the plurality of components to access a second resource of the plurality of resources, wherein the second resource of the plurality of resources is assigned a second identification number;
based on receiving the first request from the second component to access the second resource, determining whether the second identification number is stored in any assignment register of the plurality of assignment registers; and
in response to determining that the second identification number is stored in a second assignment register of the plurality of assignment registers, queuing the first request from the second component in a second queue register of the plurality of queue registers.

2. The method of claim 1, wherein assigning the first resource to the first component comprises:
receiving a second request from the first component to access the first resource; and
based on receiving the second request from the first component to access the first resource, assigning the first resource to the first component.

3. The method of claim 2, further comprising:
while the identification of the assignment of the first resource to the first component is stored in the first queue register, receiving (i) a third request from the second component of the plurality of components to access the first resource and (ii) a fourth request from a third component of the plurality of components to access the first resource; and
queuing the third request and the fourth request in the first queue register,
wherein the first queue register of the plurality of queue registers is associated with the first assignment register of the plurality of assignment registers.

4. The method of claim 3, further comprising:
selecting the third request from the third request and the fourth request; and
(i) based on selecting the third request from the third request and the fourth request and (ii) subsequent to the first component completing access to the first resource, assigning the first resource to the second component such that the second component has access to the first resource.

5. The method of claim 4, wherein selecting the third request from the third request and the fourth request comprises:
comparing a priority associated with the third request and a priority associated with the fourth request; and
based on the priority associated with the third request being higher than the priority associated with the fourth request, selecting the third request from the third request and the fourth request.

6. The method of claim 4, further comprising:
subsequent to the second component completing access to the first resource, assigning the first resource to the third component such that the third component has access to the first resource; and
(i) subsequent to the third component completing access to the first resource and (ii) based on no other component requesting access to the first resource, deleting the first identification number of the first resource stored in the first assignment register.

7. The method of claim 1, wherein the plurality of components comprises one or more of (i) a plurality of threads running on one or more processing cores, (ii) the one or more processing cores, and (iii) a plurality of hardware modules.

8. The method of claim 1, wherein the plurality of resources comprises one or more of (i) a plurality of blocks of a memory, (ii) a cache, and (iii) one or more registers.

9. A system comprising:
a plurality of components;
a plurality of resources, wherein each resource of the plurality of resources is assigned a corresponding identification number, and wherein a first resource of the plurality of resources is assigned a first identification number; and
an arbiter configured to arbitrate access to the plurality of resources by the plurality of components, wherein the arbiter comprises
an arbiter module configured to assign the first resource to a first component of the plurality of components such that the first component has access to the first resource,
a plurality of assignment registers, wherein based on the first resource being assigned to the first component, the first identification number of the first resource is stored in a first assignment register of the plurality of assignment registers, and
a plurality of queue registers, wherein based on the first resource being assigned to the first component, an identification of the assignment of the first resource to the first component is stored in a first queue register of the plurality of queue registers,
wherein while the identification of the assignment of the first resource to the first component is stored in the first queue register, the first resource is not assigned to any component, other than the first component, of the plurality of components, and
wherein the arbiter is further configured to:
receive a first request from a second component of the plurality of components to access a second resource of the plurality of resources, wherein the second resource of the plurality of resources is assigned a second identification number;
based on receiving the first request from the second component to access the second resource, determine whether the second identification number is stored in any assignment register of the plurality of assignment registers; and
in response to determining that the second identification number is stored in a second assignment register of the plurality of assignment registers, queue the first request from the second component in a second queue register of the plurality of queue registers.

10. The system of claim 9, wherein the arbiter module is configured to assign the first resource to the first component by:
receiving a second request from the first component to access the first resource; and
based on receiving the second request from the first component to access the first resource, assigning the first resource to the first component.

11. The system of claim 10, wherein the arbiter module is further configured to:
while the identification of the assignment of the first resource to the first component is stored in the first queue register, receive (i) a third request from the second component of the plurality of components to access the first resource and (ii) a fourth request from a third component of the plurality of components to access the first resource; and
queue the third request and the fourth request in the first queue register, wherein the first queue register of the plurality of queue registers is associated with the first assignment register of the plurality of assignment registers.

12. The system of claim 11, wherein the arbiter module is further configured to:
   select the third request from the third request and the fourth request; and
   (i) based on the third request being selected from the third request and the fourth request and (ii) subsequent to the first component completing access to the first resource, assign the first resource to the second component such that the second component has access to the first resource.

13. The system of claim 12, wherein the arbiter module is configured to select the third request from the third request and the fourth request by:
   comparing a priority associated with the third request and a priority associated with the fourth request; and
   based on the priority associated with the third request being higher than the priority associated with the fourth request, selecting the third request from the third request and the fourth request.

14. The system of claim 12, wherein the arbiter module is further configured to:
   subsequent to the second component completing access to the first resource, assign the first resource to the third component such that the third component has access to the first resource,
   wherein (i) subsequent to the third component completing access to the first resource and (ii) based on no other component requesting access to the first resource, the first identification number of the first resource stored in the first assignment register is deleted.

15. The system of claim 9, wherein the plurality of components comprises one or more of (i) a plurality of threads running on one or more processing cores, (ii) the one or more processing cores, and (iii) a plurality of hardware modules.

16. The system of claim 9, wherein the plurality of resources comprises one or more of (i) a plurality of blocks of a memory, (ii) a cache, and (iii) one or more registers.

17. A method for arbitrating access to a plurality of resources by a plurality of components of a computing system, the method comprising:
   assigning, to each resource of the plurality of resources, a corresponding identification number, wherein a first resource of the plurality of resources is assigned a first identification number;
   assigning the first resource to a first component of the plurality of components such that the first component has access to the first resource;
   based on assigning the first resource to the first component, storing
      (i) the first identification number of the first resource in a first assignment register of a plurality of assignment registers, and
      (ii) an identification of the assignment of the first resource to the first component in a first queue register of a plurality of queue registers;
   while the identification of the assignment of the first resource to the first component is stored in the first queue register, refraining from assigning the first resource to any component, other than the first component, of the plurality of components;
   simultaneously receiving (i) a first request from a second component of the plurality of components to access a second resource of the plurality of resources and (ii) a second request from a third component of the plurality of components to access the second resource of the plurality of resources, wherein the second resource of the plurality of resources is assigned a second identification number;
   determining that the second identification number is not stored in any assignment register of the plurality of assignment registers;
   based on determining that the second identification number is not stored in any assignment register of the plurality of assignment registers, selecting one of the first request and the second request;
   based on selecting the first request, assigning the second resource to the second component such that the second component has access to the second resource;
   based on assigning the second resource to the second component, storing the second identification number of the second resource in a second assignment register of the plurality of assignment registers; and
   queuing the second request in the first queue register of the plurality of queue registers.

18. A system comprising:
   a plurality of components;
   a plurality of resources, wherein each resource of the plurality of resources is assigned a corresponding identification number, and wherein a first resource of the plurality of resources is assigned a first identification number; and
   an arbiter configured to arbitrate access to the plurality of resources by the plurality of components, wherein the arbiter comprises
      an arbiter module configured to assign the first resource to a first component of the plurality of components such that the first component has access to the first resource,
      a plurality of assignment registers, wherein based on the first resource being assigned to the first component, the first identification number of the first resource is stored in a first assignment register of the plurality of assignment registers, and
      a plurality of queue registers, wherein based on the first resource being assigned to the first component, an identification of the assignment of the first resource to the first component is stored in a first queue register of the plurality of queue registers,
   wherein while the identification of the assignment of the first resource to the first component is stored in the first queue register, the first resource is not assigned to any component, other than the first component, of the plurality of components, and
   wherein the arbiter is further configured to:
      simultaneously receive (i) a first request from a second component of the plurality of components to access a second resource of the plurality of resources and (ii) a second request from a third component of the plurality of components to access the second resource of the plurality of resources, wherein the second resource of the plurality of resources is assigned a second identification number;
      determine that the second identification number is not stored in any assignment register of the plurality of assignment registers;
      based on determining that the second identification number is not stored in any assignment register of the plurality of assignment registers, select one of the first request and the second request;

based on selecting the first request, assign the second resource to the second component such that the second component has access to the second resource;

based on assigning the second resource to the second component, store the second identification number of the second resource in a second assignment register of the plurality of assignment registers; and queue the second request in the first queue register of the plurality of queue registers.

* * * * *